(12) United States Patent
Tschida et al.

(10) Patent No.: US 7,886,767 B2
(45) Date of Patent: Feb. 15, 2011

(54) HYDRAULIC VALVE WITH SPOOL POSITION SENSING ASSEMBLY

(75) Inventors: Donald Walter Tschida, Fort Wayne, IN (US); Brian Bernard Slattery, Hicksville, OH (US)

(73) Assignee: Parker-Hannifin Corporation, Cleveland, OH (US)

( * ) Notice: Subject to any disclaimer, the term of this patent is extended or adjusted under 35 U.S.C. 154(b) by 954 days.

(21) Appl. No.: 11/786,229

(22) Filed: Apr. 11, 2007

(65) Prior Publication Data
US 2008/0202608 A1 Aug. 28, 2008

Related U.S. Application Data

(60) Provisional application No. 60/891,795, filed on Feb. 27, 2007.

(51) Int. Cl.
*F16K 37/00* (2006.01)
(52) U.S. Cl. .................. 137/554; 137/625.25
(58) Field of Classification Search ............. 137/554, 137/625.2, 625.61–625.69, 625.21–625.27; 251/129.02
See application file for complete search history.

(56) References Cited

U.S. PATENT DOCUMENTS 4,793,241 A 12/1988 Mano et al.
5,926,018 A * 7/1999 Jones ................. 324/207.26
6,152,172 A 11/2000 Christianson et al.
6,789,570 B2 * 9/2004 Beyrak et al. ............. 137/554
2005/0092100 A1 5/2005 Lehker et al.

FOREIGN PATENT DOCUMENTS

WO 20070076750 A 7/2007

OTHER PUBLICATIONS

Parker Hannifin Corporation, Elyria, Ohio, USA, Series V10 Directional Control Valve, Bulletin HY14-2701-B1/US, Feb. 1, 2004, pp. 4 & 5.

* cited by examiner

*Primary Examiner*—John Rivell
*Assistant Examiner*—Andrew J Rost
(74) *Attorney, Agent, or Firm*—Daniel J. Whitman

(57) ABSTRACT

A hydraulic valve includes a valve body, a valve spool that is movable relative to the valve body for controlling fluid flow through the valve body, and a spool return assembly for biasing the valve spool into a centered position relative to the valve body. The hydraulic valve further includes a position sensor assembly having a sensor portion affixed relative to the valve body and a movable portion that is movable relative to the sensor portion in response to movement of the valve spool. The sensor portion is responsive to a position of the movable portion for outputting a signal indicative of the position of the valve spool relative to the valve body. The movable portion of the position sensor assembly is biased into engagement with the spool return assembly.

9 Claims, 6 Drawing Sheets

US 7,886,767 B2

HYDRAULIC VALVE WITH SPOOL POSITION SENSING ASSEMBLY

RELATED APPLICATION

This application claims priority of U.S. Provisional Application No. 60/891,795 filed Feb. 27, 2007 and entitled "Hydraulic Control Valve Spool Position Sensor Assembly", which is hereby incorporated herein by reference

TECHNICAL FIELD

The present invention relates to a hydraulic valve incorporating a sensor assembly for sensing a position of the valve spool.

BACKGROUND OF THE INVENTION

Mobile equipment may include a valve assembly for controlling one or more functions. The valve assembly may include a single valve or may include a number of valves. A valve assembly with multiple valves is often referred to as a sectional valve. The valve assembly controls the fluid supplied to and received from one or more actuators used for performing defined functions. For example, a valve assembly may be used for controlling the movement of a bucket of a wheel loader. Valve assemblies may be manually actuatable or electrically actuatable, such as with a solenoid.

Commonly, valve assemblies include spool valves. A spool valve has a spool that is moveable relative to a valve body for controlling the flow of fluid through the valve. In certain applications, it is desirable to know a position of the spool relative to the valve body.

U.S. Pat. No. 6,152,172 discloses a spool position sensor for a hydraulic control valve. The spool position sensor of this patent includes a coupling that is fixed to an end of the spool of the valve. A magnet is fixed within the coupling and moves with movement of the spool past a Hall effect sensor fixed relative to the valve body for providing an indication of the position of the spool.

SUMMARY OF THE INVENTION

The present invention relates to a hydraulic valve. The hydraulic valve comprises a valve body, a valve spool that is movable relative to the valve body for controlling fluid flow through the valve body, and a spool return assembly for biasing the valve spool into a centered position relative to the valve body. The hydraulic valve further includes a position sensor assembly having a sensor portion affixed relative to the valve body and a movable portion that is movable relative to the sensor portion in response to movement of the valve spool. The sensor portion is responsive to a position of the movable portion for outputting a signal indicative of the position of the valve spool relative to the valve body. The movable portion of the position sensor assembly is biased into engagement with one of the spool and the spool return assembly.

BRIEF DESCRIPTION OF THE DRAWINGS

The foregoing and other features of the present invention will become apparent to those skilled in the art to which the present invention relates upon reading the following description with reference to the accompanying drawings, in which.

DESCRIPTION OF PREFERRED EMBODIMENT

Figure 1:
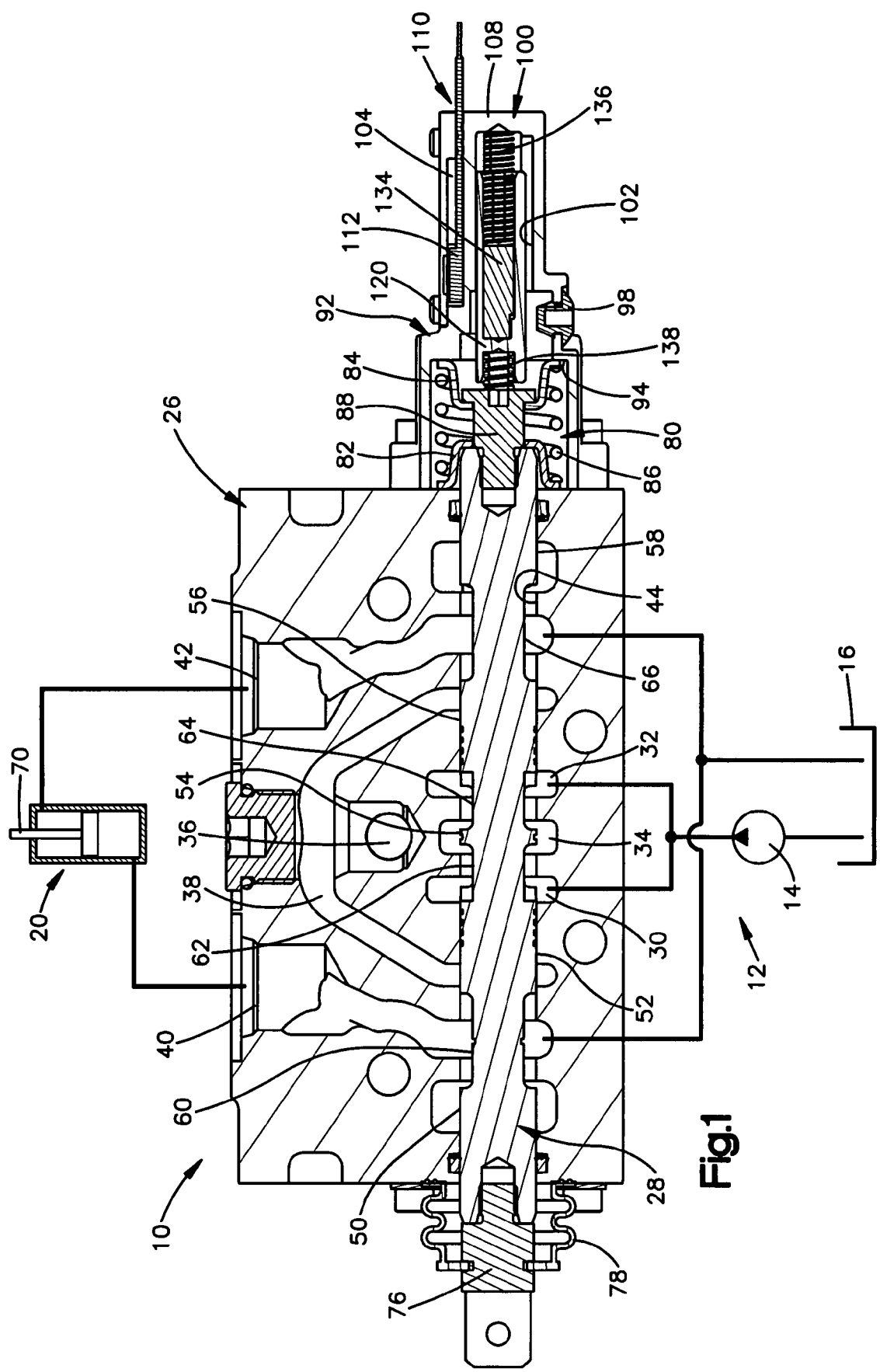
FIG. 1 is a cross-sectional view of a valve constructed in accordance with the present invention within a hydraulic system with a spool of the valve being located in a centered position.

FIG. 1 illustrates a valve 10 of a hydraulic valve assembly for a hydraulic system 12. The hydraulic system 12 illustrated in FIG. 1 includes a pump 14 and a reservoir 16. The valve 10 illustrated in FIG. 1 is associated with an actuatable device, such as actuator 20. The valve 10 receives fluid from the pump 14 and controls the flow of the fluid to actuator 20 and the return of fluid from the actuator to the reservoir 16.

The valve 10 illustrated in FIG. 1 is an open center control valve. Other valves having spools are also contemplated by the present invention. The valve 10 illustrated in FIG. 1 includes a valve body 26 and a valve spool 28. The valve body 26 includes center ports 30 and 32 for receiving fluid from pump 14 and center port 34 for returning fluid to reservoir 16. The valve body 26 also includes parallel port 36, which also receives fluid from pump 14 and directs the fluid into channel 38 of the valve body. System ports 40 and 42 also extend into the valve body 26 to a spool bore 44.

The spool 28 extends through the spool bore 44 of the valve body 26 and is moveable relative to the valve body for controlling actuation of actuator 20. The spool 28 illustrated in FIG. 1 includes five lands 50, 52, 54, 56, and 58 and four grooves 60, 62, 64, and 66. When the spool 28 is positioned as shown in FIG. 1, the flow of fluid from pump 14 is directed into center ports 30 and 32 and parallel port 36. Fluid from parallel port 36 flows into channel 38. The flow of fluid out of channel 38 is prevented by lands 52 and 56. The fluid received in center ports 30 and 32 passes through the spool bore 44, via grooves 62 and 64, and into center port 34 for return to reservoir 16.

Figure 2:
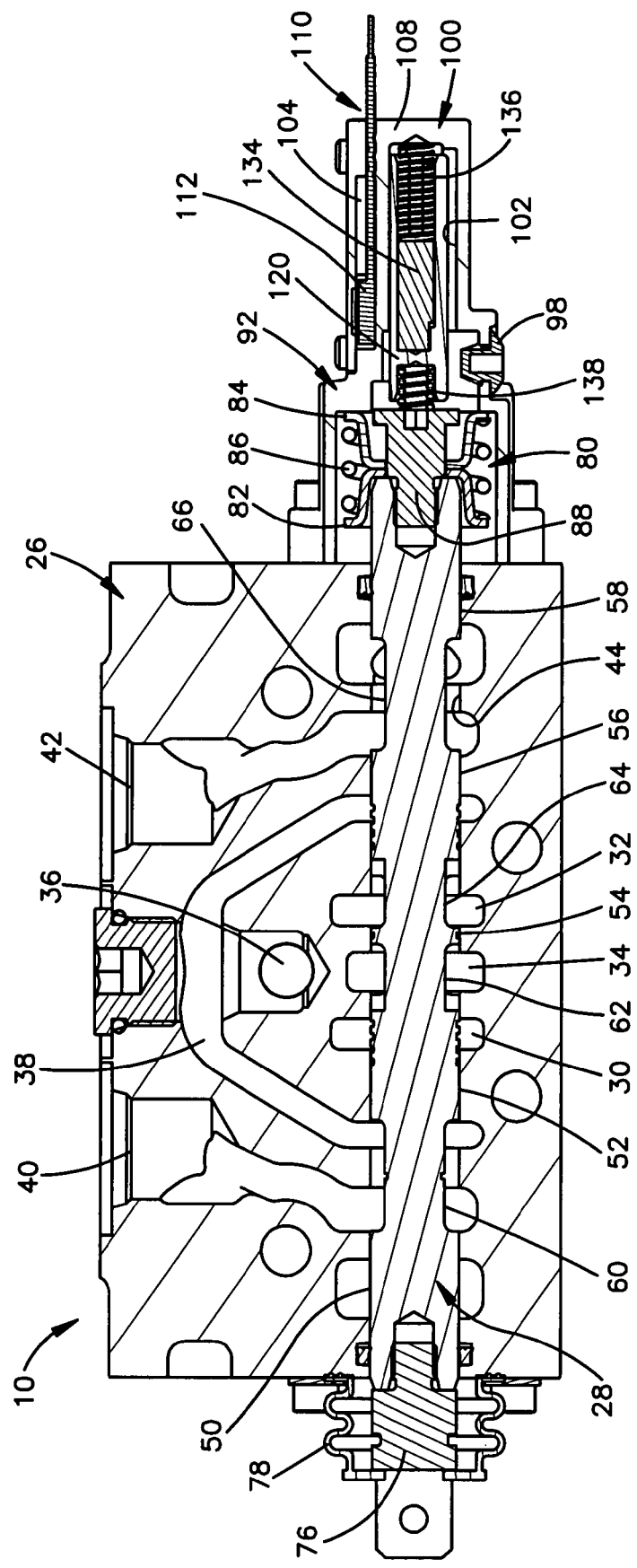
FIG. 2 illustrates the valve of FIG. 1 with the spool moved rightward into an actuated position.

When the spool 28 is actuated rightward relative to the valve body 26 into the position shown in FIG. 2, lands 52 and 54 prevent the fluid flowing into center ports 30 and 32 from exiting the valve 10 through center port 34. The fluid entering port 36 flows through channel 38, through groove 60, exits the valve 10 via port 40, and enters the lower chamber, as illustrated in FIG. 1 of the actuator 20. The receipt of fluid in the lower chamber of the actuator 20 causes upward movement of the piston 70 of the actuator and forces fluid out of the upper chamber, as viewed in FIG. 2, of the actuator. The fluid exiting the upper chamber enters port 42 of the valve 10, passes through groove 66, and is directed to the reservoir 16.

Figure 3:
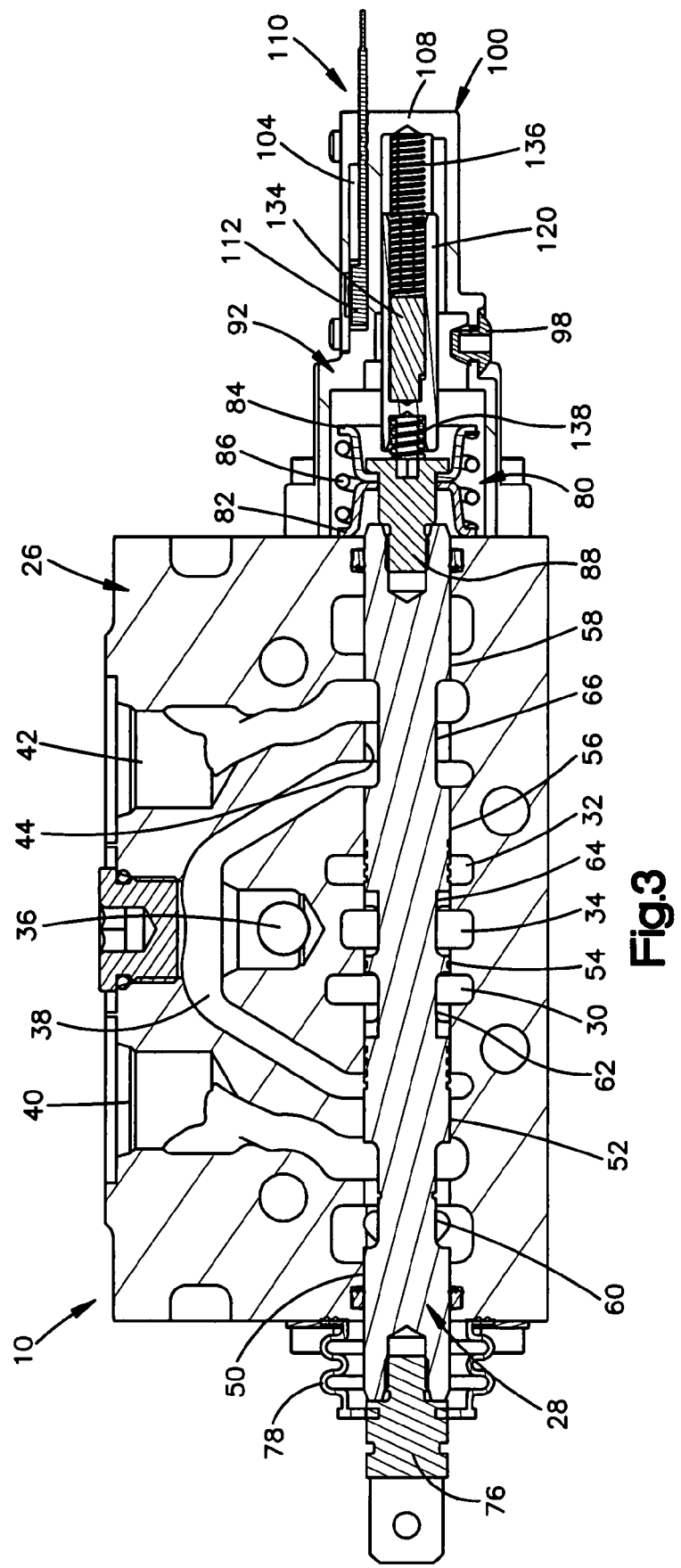
FIG. 3 illustrates the valve of FIG. 1 with the spool moved leftward into an actuated position.

Similarly, when the spool 28 is actuated leftward into the position shown in FIG. 3, lands 54 and 56 prevent the fluid flowing into center ports 30 and 32 from exiting the valve through center port 34. The fluid entering port 36 flows through channel 38, through groove 66, exits the valve 10 via port 42, and enters the upper chamber, as illustrated in FIG. 1, of the actuator 20. The receipt of fluid into the upper chamber of the actuator 20 causes downward movement of the piston 70 of the actuator and forces fluid out of the lower chamber of the actuator. The fluid exiting the lower chamber enters port 40 of the valve 10, passes through groove 60, and is directed to the reservoir 16.

A coupling 76 is attached to one end of the spool 28 illustrated in FIG. 1. The coupling 76 provides a means for enabling attachment of the spool to a spool actuator, such as a manual linkage. FIG. 1 also illustrates a boot seal 78 that extends between the coupling 76 and the valve body 26 for preventing contaminants from entering the valve bore 44.

A spool return assembly 80 is affixed to the end of the spool 28 opposite the coupling 76. The spool return assembly 80 includes first and second spring collars 82 and 84, respectively, a helical spring 86, and a spool screw 88. The helical spring 86 is interposed between the first and second spring collars 82 and 84. The spool screw 88 extends through the first and second spring collars 82 and 84 and the center of the helical spring 86 to affix the spring collars and the spring to the end of the spool 28.

The spool return assembly 80 is located within an enclosure 92 that is affixed to the valve body 26. The spool return assembly 80 tends to bias the spool 28 into the centered position of FIG. 1. When the spool 28 is in a centered position, as shown in FIG. 1, the first spring collar 82 engages the valve body 26 and the second spring collar 84 engages a shoulder 94 within the enclosure 92. When the spool 28 is moved rightward relative to the valve body 26 into the position shown in FIG. 2, the first spring collar 82 moves away from the valve body 26 to compress the helical spring 86. When in the position illustrated in FIG. 2, the helical spring 86 applies a force on the spool 28 that tends to move the spool back toward the centered position of FIG. 1. Similarly, when the spool 28 is moved leftward relative to the valve body 26 into the position shown in FIG. 3, the second spring collar 84 moves away from the shoulder 94 of the enclosure 92 to compress the helical spring 86. When in the position illustrated in FIG. 3, the helical spring 86 applies a force on the spool 28 that tends to move the spool back toward the centered position of FIG. 1.

A grommet check 98, which may be formed from a nitrile material, extends through a hole in the enclosure and acts as a vent. The grommet check 98 prevents the housing 14 from becoming pressurized if the seals around the spool 28 fail and leak oil into the enclosure 92. The grommet check 98 is designed to open at one psi internal pressure.

The enclosure 92 also includes an extension 100 that includes an elongated cavity 102 and a sensor chamber 104 that is located radially outwardly of the elongated cavity. The elongated cavity terminates at an end wall 108 of the extension 100. A cover 106 is attachable to the enclosure 92 for closing the sensor chamber 104.

Figure 4:
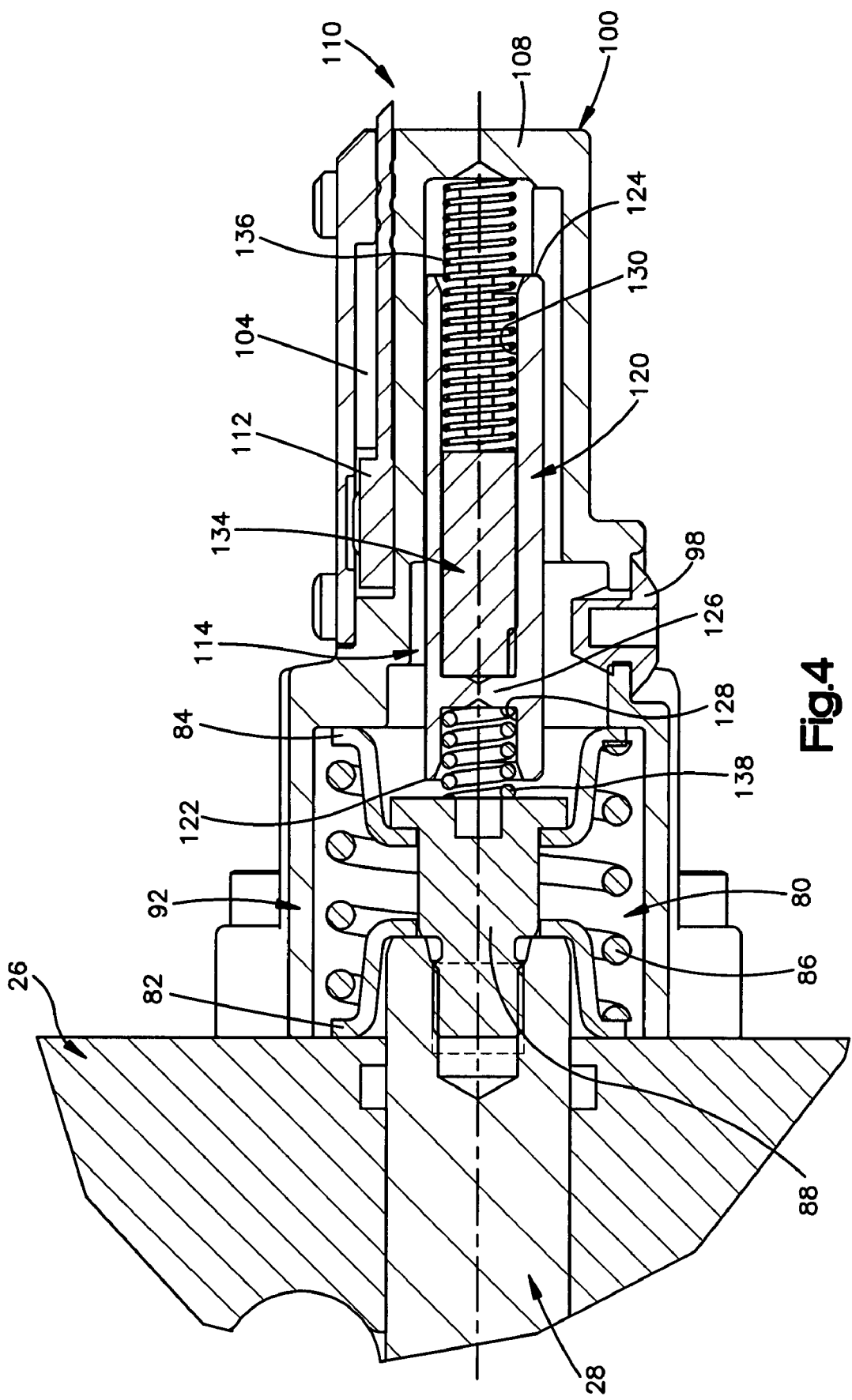
FIG. 4 is an enlarged view of the spool position sensor assembly mounted to the valve.
Figure 5:
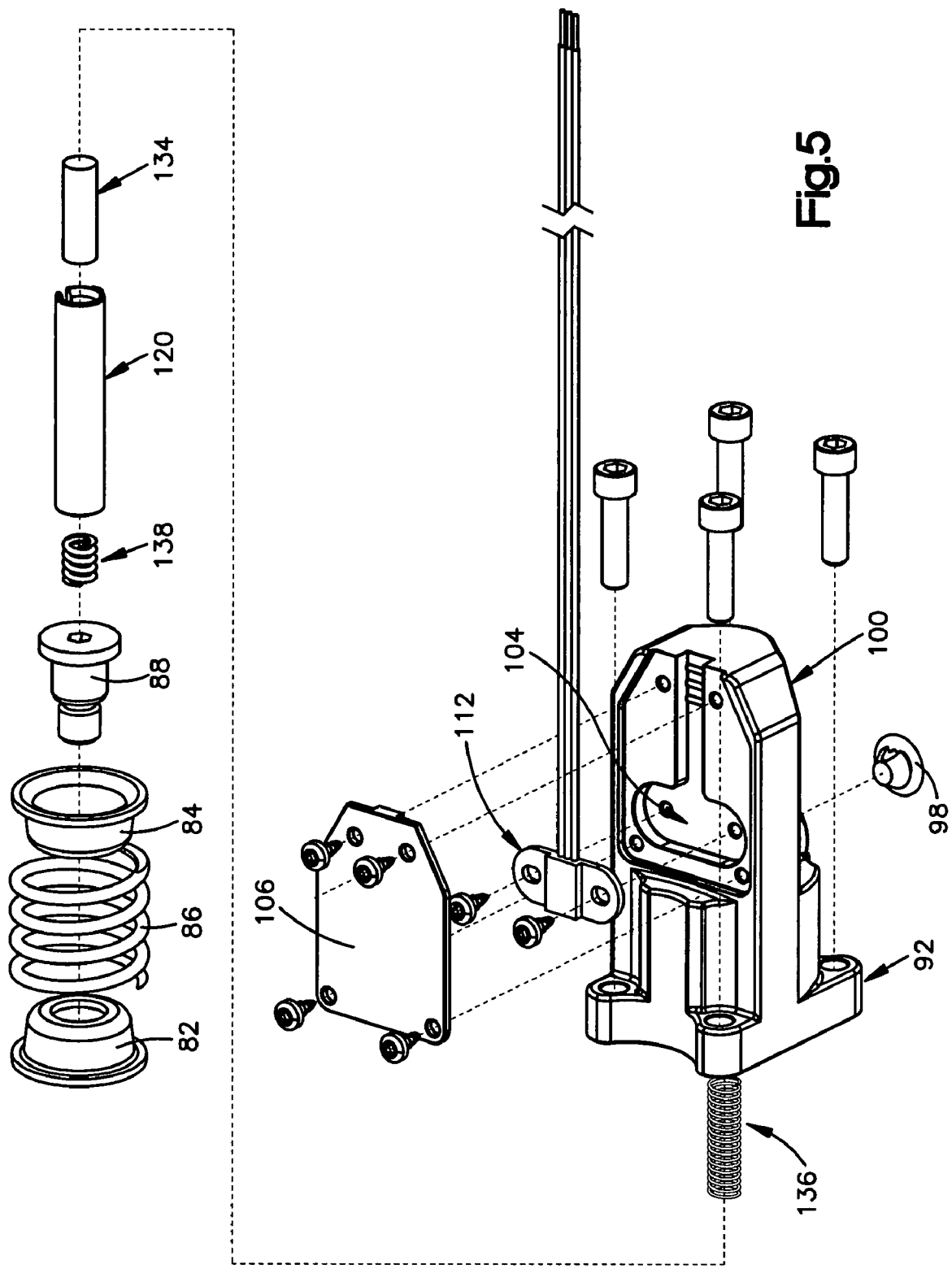
FIG. 5 is an exploded view of the spool position sensor assembly and the spool return assembly of the valve of FIG. 1.

The valve 10 also includes a position sensor assembly 110. The position sensor assembly 110 includes a sensor portion 112 and a movable portion 114. In the illustrated embodiment, the sensor portion 112 is fixed relative to the valve body 26. As best shown in FIG. 4, the sensor portion 112 is located within the sensor chamber 104 of the extension 100 of the enclosure 92. In one embodiment to the invention, the sensor portion 112 is a Hall effect sensor and is responsive to magnetic flux for outputting a signal indicative of a position of the spool 28.

With reference to FIG. 4, the movable portion 114 of the position sensor assembly 110 in the illustrated embodiment includes a glide member 120. The glide member 120 is formed from a non-ferrous material, such as plastic. The glide member 120 includes opposite first and second ends 122 and 124, respectively. A cavity 128 extends into the first end 122 of the glide member 120 and extends over approximately twenty percent of the length of the glide member. Another cavity 130 extends into the second end 124 of the glide member 120 and extends over approximately seventy percent of the length of the glide member. A partition portion 126 of the guide member 120 separates the cavities 128 and 130.

The movable portion 114 also includes a permanent magnet 134. The permanent magnet 134 is sized to be easily dropped into the cavity 130 of the glide member 120. A spring 136 extends into cavity 130 to bias magnet 134 against the partition portion 126 of the glide portion. A spring 138 extends into cavity 128 and seats against the partition portion 126. Spring 136 has a lower spring constant than spring 138 so that spring 136 compresses prior to spring 138. Spring 136 is non-ferrous. In one embodiment of the invention, spring 136 is formed from beryllium copper. Spring 138 is formed from 302 stainless steel for corrosion resistance.

The movable portion 114 is received in the elongated cavity 102 of the extension 100 of the enclosure 92. When received in the elongated cavity 102, spring 136 abuts against the end wall 108 of the extension 100. When the enclosure 92 is affixed relative to the valve body 26 in the position illustrated in FIGS. 1-4, spring 136 biases the movable portion 114 away from the end wall 108 of the enclosure 92 and into a position in which spring 138 is in abutting engagement with the spool screw 88 of the spool return assembly 80. Spring 136 is sufficiently sized to maintain spring 138 in abutting engagement with the spool screw 88 at all times during movement of the spool 28 during operation of the valve 10.

When the spool 28 of the valve 10 is moved rightward from the position illustrated in FIG. 1 to the position illustrated in FIG. 2, the spool screw 88 acts against spring 138 to force the movable portion 114 of the position sensor assembly 110 in a rightward direction, as viewed in FIG. 1. Since spring 136 has a lower spring constant than spring 138, the force from the spool screw 88 is transferred through spring 138 and the glide member 120 to compress spring 136. As a result, the glide member 120 and thus, the magnet 134 are moved rightward with the movement of the spool 28. The rightward movement of the magnet 134 relative to the sensor portion 112 varies the magnetic flux sensed by the sensor portion. The sensor portion 112 outputs a signal indicative of the varied magnetic flux. This output signal is also indicative of the position of the spool 28 relative to the housing 26.

When the spool 28 of the valve 10 is moved leftward from the position illustrated in FIG. 1 to the position illustrated in FIG. 3, spring 136 biases the glide member 120 toward the spool screw 88. As a result of the bias of spring 136, the glide member 120 moves with the spool 28 so as to maintain spring 138 in abutting engagement with the spool screw 88. Movement of the glide member 120 with the spool 28 results in a leftward movement of the magnet 134 with the glide member. The leftward movement of the magnet 134 relative to the sensor portion 112 varies the magnetic flux sensed by the sensor portion. The sensor portion 112 outputs a signal indicative of the varied magnetic flux. This output signal is also indicative of the position of the spool 28 relative to the housing 26.

The position sensor assembly 110 is advantage over other known position sensors for many reasons. The position sensor assembly 110 requires no modification of the spool return mechanism 80 as no portion of the position sensor assembly 110 is affixed to the spool 28 or to the spool return mechanism. Since no modifications to the spool return mechanism 80 are required, the position sensor assembly 110 may be added to valves in the field without the need for field modifications of the valves. Such modification or retrofitting of field units may be done by simply removing the existing end cap of the valve and replacing it with the position sensor assembly 110.

Figure 6:
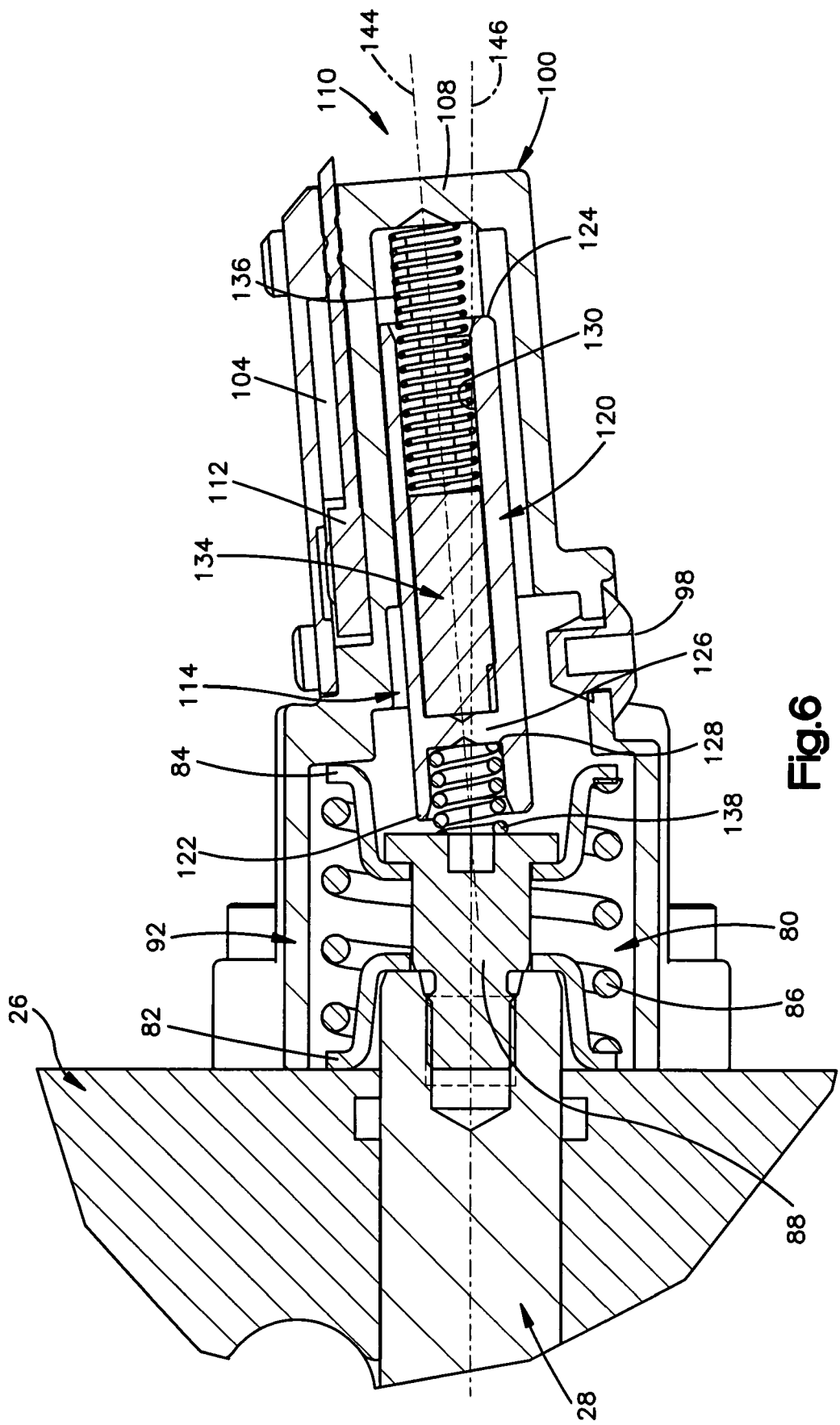
FIG. 6 is an enlarged view of the spool position sensor assembly mounted to the valve such that a portion of the position sensor assembly moves along an axis angled relative to an axis of the spool.

Additionally, since the position sensor assembly 110 does not require any physical attachment to the valve spool 28 or spool return assembly 80, the position sensor assembly 110 does not require any special alignment to the valve spool 28 or valve housing 26. For example, prior art position sensors having a portion affixed to the valve spool require that the affixed portion moves along the axis of the valve spool. As a result, the prior art position sensors must be physically aligned relative to the valve body to allow this movement along the axis of the valve spool. The position sensor assembly 110 of the present invention does not require such alignment. As illustrated in FIG. 6, since the movable portion 114 of the position sensor assembly 110 is not affixed to either the spool 28 or the spool return assembly 80, the moveable portion 114 may move along an axis 144 that is angled relative to an axis 146 of the spool during operation of the valve 10 and position sensing of the spool 28. By requiring no special alignment, the position sensor assembly 110 is easier to install than prior art sensors.

From the above description of the invention, those skilled in the art will perceive improvements, changes and modifications. Such improvements, changes and modifications within the skill of the art are intended to be covered by the appended claims.

What is claimed is:

1. A hydraulic valve comprising:
   a valve body;
   a valve spool movable relative to the valve body for controlling fluid flow through the valve body;
   a spool return assembly for biasing the valve spool into a centered position relative to the valve body; and
   a position sensor assembly having a sensor portion affixed relative to the valve body and a movable portion that is movable relative to the sensor portion in response to movement of the valve spool, the sensor portion being responsive to a position of the movable portion for outputting a signal indicative of the position of the valve spool relative to the valve body,
   the movable portion of the position sensor assembly including a glide member, first and second springs, and a magnet, the magnet being received in a cavity of the glide member, the first spring holding the magnet relative to the glide member and biasing the second spring into engagement with one of the spool and the spool return assembly,
   wherein the cavity of the glide member ends at a partition, the first spring is received in the cavity of the glide member and biases the magnet against the partition.

2. The hydraulic valve of claim 1 wherein the second spring of the movable portion of the position sensor assembly spaces the glide member away from the one of the spool and the spool return assembly.

3. The hydraulic valve of claim 1 wherein the movable portion of the position sensor assembly is adapted to move along an axis that is angled relative to an axis of the valve spool.

4. The hydraulic valve of claim 1 wherein both the glide member and the first spring are formed from non-ferrous material.

5. The hydraulic valve of claim 1 wherein the first spring has a lower spring constant than the second spring so that the first spring compresses prior to the second spring.

6. The hydraulic valve of claim 1 wherein no portion of the position sensor assembly is affixed to the spool return assembly.

7. The hydraulic valve of claim 1 wherein no portion of the position sensor assembly is affixed to the one of the spool and the spool return assembly such that the movable portion of the position sensor assembly is adapted to move along an axis that is angled relative to an axis of the valve spool.

8. The hydraulic valve assembly of claim 1 wherein the cavity of the glide member is a first cavity, the glide member further including a second cavity that is separated from the first cavity by the partition, the second spring being received in the second cavity.

9. The hydraulic valve assembly of claim 1 wherein the spool return assembly also includes a spring that is not one of the first and second springs.

* * * * *